United States Patent
Kim et al.

(10) Patent No.: US 9,837,937 B2
(45) Date of Patent: Dec. 5, 2017

(54) PIEZOELECTRIC POWER GENERATION SYSTEM

(71) Applicants: Namhyo Kim, Houston, TX (US); Parul Patel Anderson, Houston, TX (US)

(72) Inventors: Namhyo Kim, Houston, TX (US); Parul Patel Anderson, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 422 days.

(21) Appl. No.: 14/560,593

(22) Filed: Dec. 4, 2014

(65) Prior Publication Data

US 2016/0164437 A1 Jun. 9, 2016

(51) Int. Cl.
*H02N 2/18* (2006.01)
*E21B 41/00* (2006.01)

(52) U.S. Cl.
CPC ......... *H02N 2/185* (2013.01); *E21B 41/0085* (2013.01); *H02N 2/183* (2013.01)

(58) Field of Classification Search
CPC .......... H02N 2/185; H02N 2/183; H02N 3/00; H02N 2/186; E21B 41/0085; E21B 47/18; E21B 47/12
USPC ........................................... 310/339; 367/81
See application file for complete search history.

(56) References Cited

U.S. PATENT DOCUMENTS

| 6,011,346 | A * | 1/2000 | Buchanan | E21B 41/0085 310/339 |
| 2002/0153785 | A1* | 10/2002 | Fukuyama | F16C 19/14 310/66 |
| 2005/0012340 | A1* | 1/2005 | Cousins | H02P 6/15 290/52 |
| 2005/0280334 | A1* | 12/2005 | Ott | H01L 41/1136 310/339 |
| 2009/0269198 | A1* | 10/2009 | Grohmann | B64C 27/615 416/23 |
| 2012/0139250 | A1* | 6/2012 | Inman | E21B 21/10 290/52 |
| 2012/0228875 | A1* | 9/2012 | Hardin, Jr. | E21B 41/0085 290/52 |
| 2012/0319409 | A1* | 12/2012 | Schoonover | E21B 41/0085 290/1 R |

* cited by examiner

*Primary Examiner* — Bryan Gordon
(74) *Attorney, Agent, or Firm* — King & Spalding LLP

(57) ABSTRACT

A piezoelectric power generation device includes a stator, a rotor, and one or more piezoelectric power generation elements. The stator comprises an internal surface which defines an internal orifice. The one or more piezoelectric power generation elements are disposed on the internal surface of the stator. The rotor is disposed within the internal orifice comprising one or more lobes formed on an outside surface of the rotor. The rotor is configured to rotate with respect to the stator and the one or more piezoelectric power generation elements. The one or more lobes contact the one or more piezoelectric power generation elements as the one or more lobes rotate past the one or more piezoelectric power generation elements. The one or more piezoelectric power generation elements generate energy when contacted by the one or more lobes.

23 Claims, 7 Drawing Sheets

PIEZOELECTRIC POWER GENERATION SYSTEM

TECHNICAL FIELD

The present application relates to fluid induced power generation. Specifically, the present application relates to a piezoelectric power generation system with protected piezoelectric elements.

BACKGROUND

Many modern systems and equipment are equipped with various electronic sensing and control devices to enhance and carry out functionality of the systems. The capabilities of these systems range from monitoring system and environmental conditions to controlling aspects of the system based on these conditions or other control parameters. Such sensing and control devices, as well as some other electronic components of the system need to be powered. However, many of these systems are located remote from power sources, such as systems in subterranean or downhole environments, as is common in the oil and gas industry. In such cases, it may undesirable or impractical to provide power lines from the power sources to the systems.

Remote power generation systems were developed and often used to generate power at the system and provide power to the system electronics. A number of power generation methods are used, including flow induced vibration, fluid flow energy, radioactive materials, and the like. One prominent remote power generation technique involves the use of piezoelectric elements, which generate energy through vibrational motion. For example, in downhole systems, the current state of the art is to expose small and independent piezoelectric elements against the flow of a fluid stream so that the interaction between the piezoelectric elements and the fluid stream maintains a level of high frequency vibration, causing the piezoelectric elements to generate and output energy. However, when piezoelectric elements are exposed to the fluid flow stream, which may contain particulates, erosion or other wear on the piezoelectric elements may occur, decreasing the longevity of the piezoelectric elements and thus the power generation system.

SUMMARY

In general, in one aspect, the disclosure relates to a piezoelectric power generation system. The system includes a power generation device, an impeller, and a power storage device. The power generation device includes a stator and a rotor. The stator comprises an internal surface which defines an internal orifice. The stator further includes one or more piezoelectric elements disposed on the internal surface of the stator, and a rotor disposed within the internal orifice comprising one or more lobes formed on an outside surface of the rotor. The rotor is configured to rotate with respect to the stator and the one or more piezoelectric power generation elements. The one or more lobes contact the one or more piezoelectric power generation elements as the one or more lobes rotate past the one or more piezoelectric power generation elements. The one or more piezoelectric power generation elements generate energy when contacted by the one or more lobes. The impeller is coupled to the rotor and configured to rotate the rotor when the impeller is actuated by a flow of fluid. The power storage device is configured to store energy generated by the one or more piezoelectric power generation elements.

In another aspect, the disclosure can generally relate to a piezoelectric power generation device. The piezoelectric power generation device includes a stator, a rotor, and one or more piezoelectric power generation elements. The stator comprises an internal surface which defines an internal orifice. The one or more piezoelectric power generation elements are disposed on the internal surface of the stator. The rotor is disposed within the internal orifice comprising one or more lobes formed on an outside surface of the rotor. The rotor is configured to rotate with respect to the stator and the one or more piezoelectric power generation elements. The one or more lobes contact the one or more piezoelectric power generation elements as the one or more lobes rotate past the one or more piezoelectric power generation elements. The one or more piezoelectric power generation elements generate energy when contacted by the one or more lobes.

In another aspect, the disclosure can generally relate to a piezoelectric power generation device. The device includes a rotor, a stator, and one or more piezoelectric power generation elements. The rotor comprises an internal surface defining an internal orifice. The internal surface includes one or more lobes disposed thereon. The stator is disposed within the internal orifice and comprises an outer surface. The one or more piezoelectric elements are disposed on the outer surface of the stator towards the internal surface of the rotor. The rotor is configured to rotate around the stator and the one or more piezoelectric power generation elements. The one or more lobes contact the one or more piezoelectric power generation elements as the one or more lobes rotate past the one or more piezoelectric power generation elements. The one or more piezoelectric power generation elements generate energy when contacted by the one or more lobes.

These and other aspects, objects, features, and embodiments will be apparent from the following description and the appended claims.

BRIEF DESCRIPTION OF THE DRAWINGS

The drawings illustrate only example embodiments of the present disclosure, and are therefore not to be considered limiting of its scope, as the disclosures herein may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements. In one or more embodiments, one or more of the features shown in each of the figures may be omitted, added, repeated, and/or substituted. Accordingly, embodiments of the present disclosure should not be limited to the specific arrangements of components shown in these figures.

DETAILED DESCRIPTION OF EXAMPLE EMBODIMENTS

Figure 1:
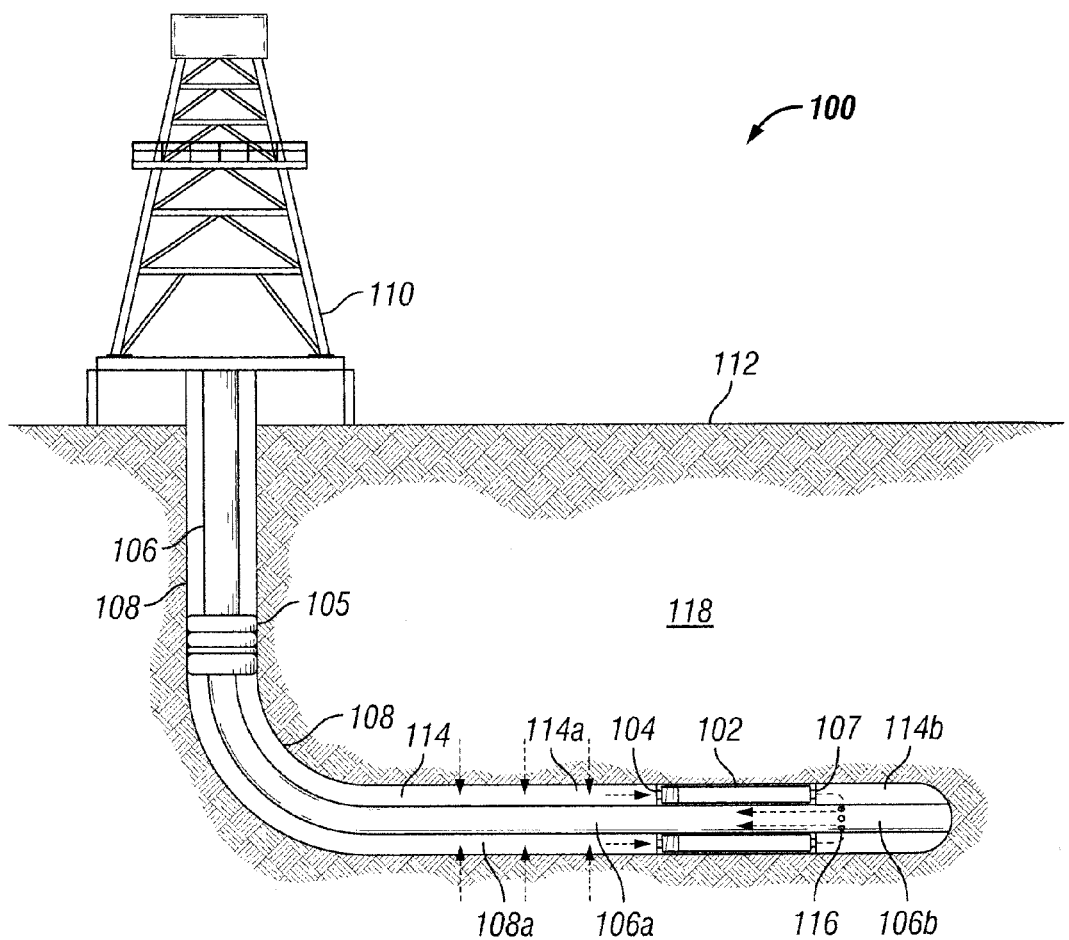
FIG. 1 illustrates a schematic diagram of an example application of a piezoelectric power generation system, in which the piezoelectric power generation system is used in a downhole environment, in accordance with example embodiments of the present disclosure.

Example embodiments directed to power generation systems and methods will now be described in detail with reference to the accompanying figures. Like, but not necessarily the same or identical, elements in the various figures are denoted by like reference numerals for consistency. In the following detailed description of the example embodiments, numerous specific details are set forth in order to provide a more thorough understanding of the disclosure herein. However, it will be apparent to one of ordinary skill in the art that the example embodiments disclosed herein may be practiced without these specific details. In other instances, well-known features have not been described in detail to avoid unnecessarily complicating the description. The example embodiments illustrated herein include certain components that may be replaced by alternate or equivalent components in other example embodiments as will be apparent to one of ordinary skill in the art. Many example embodiments discussed in the present disclosure are directed towards a downhole power generation application. Such examples are employed to exhibit features of the present disclosure in context, and not as a limitation on the application of such. In practice, the systems and techniques disclosed herein have applications in subterranean environments, underwater environments, and above-ground systems.

Referring now to the drawings, FIG. 1 illustrates an example application of a piezoelectric power generation system 102. Specifically, FIG. 1 illustrates a schematic diagram of a well site 100 in which the piezoelectric power generation system 102 has been deployed, in accordance with example embodiments of the present disclosure. In certain example embodiments, and as illustrated, the piezoelectric power generation system 102 (hereinafter "power generation system") is deployed in a wellbore 108. The wellbore 108 is formed in a subterranean formation 118 and coupled to a rig 110 on a surface 112 of the formation 118. The formation 118 can include one or more of a number of formation types, including but not limited to shale, limestone, sandstone, clay, sand, and salt. The surface 112 may be ground level for an on-shore application or the sea floor for an off-shore application. In certain embodiments, a subterranean formation 118 can also include one or more reservoirs in which one or more resources (e.g., oil, gas, water, steam) are located. In certain example embodiments, the wellbore 108 is cased with cement or other casing material, which is perforated to allow fluids to flow from the formation 118 into the well 108. In certain example embodiments, the well 108 is a multi-zone well. A production tubing 106 is disposed downhole within the well 108. Fluids are recovered and brought to the rig 110 through the production tubing 106. In certain example embodiments, a production packer 105 is coupled to the production tubing 106.

In certain example embodiments, the power generation system 102 is disposed in an annular space 114 around a portion of the production tubing 106. In certain example embodiments, the power generation system 102 is sealed between the production tubing 106 and the wellbore 108 such that fluid traveling from a first portion 114a of the annular space to a second portion 114b of the annular space is forced to travel through at least a portion of the power generation system 102, in which the first portion 114a of the annular space is adjacent a first end 104 of the electric power generation system 102 and the second portion 114b of the annular space is adjacent a second end 107 of the power generation system 102.

In certain example embodiments, a first portion of the production tubing 106a adjacent the first portion of the annular space 114a and the first end 104 of the power generation system 102 is not perforated, such that production fluid flowing into the first portion of the wellbore 108a does not flow directly into the first portion of the production tubing 106a. Rather, in certain example embodiments, production fluid flowing into the first portion of the wellbore 108a is forced to flow through the power generation system 102 and into the second portion of the annular space 114b. In certain example embodiments, a second portion of the production tubing 106b adjacent the second portion of the annular space 114b contains perforations 116, which allow the production fluid to flow from the second portion of the annular space 114b into the production tubing 106. The production fluid can then travel to the surface 112 where it is recovered.

Figure 2:
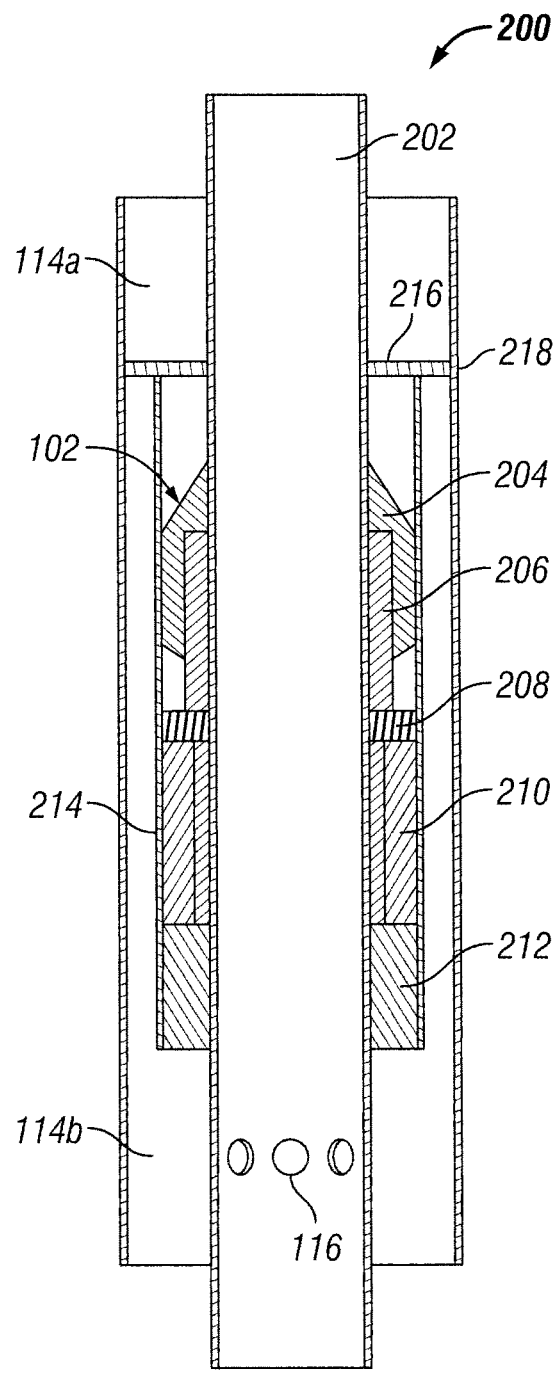
FIG. 2 illustrates a cross-sectional diagram of the power generation system disposed around a pipe, in accordance with example embodiments of the present disclosure.

In practice, the power generation system 102 can be used in many other applications other than the downhole application described in FIG. 1. FIG. 2 illustrates a cross-sectional diagram 200 of the power generation system 102 disposed around a pipe 202, in accordance with example embodiments of the present disclosure. The pipe 202 can be any type of tubular structure, including pipes in a production well, pipes within a refinery or other process facility, and a pipeline. Generally, the pipe 202 can be any tubular structure configured to transport fluid from one location to another. In certain example embodiments, the power generation system 102 includes an impeller 204 coupled to a power generation unit 210 via a bearing system 206. As fluid flows through the impeller 204, the impeller rotates, actuating the power generation unit 210. In certain example embodiments, the power generation system 102 includes a power and electronics unit 212. In certain example embodiments, the power and electronics unit 212 includes a power storage device which stores the power generated by the power generation unit 210 and supplies power to various peripheral electronics devices. In certain example embodiments a seal is disposed over the power generation unit 210 to prevent external fluids or debris from entering the power generation unit 210. In certain example embodiments, the power generation system 102 is disposed within a housing 214. In certain example embodiments, the housing 214 includes a selectable power port 216 and a selectable production port 218. The selectable power port 216 and the selectable production port 218 can both be opened or closed by control. In certain example embodiments, when the power port 216 is open and the production port 218 is closed, fluid is forced to traverse the impeller 204 when flowing from the first portion 114*a* to the second portion 114*b* of an annular space. Thus, the impeller 204 rotates and the power generation unit 210 is actuated and power is generated. When the power port 216 is closed and the production port is open, the fluid flows around the power generation system 102 and bypasses the impeller 204. Thus, the power generation unit 210 is not actuated and power is not generated.

Figure 3A:
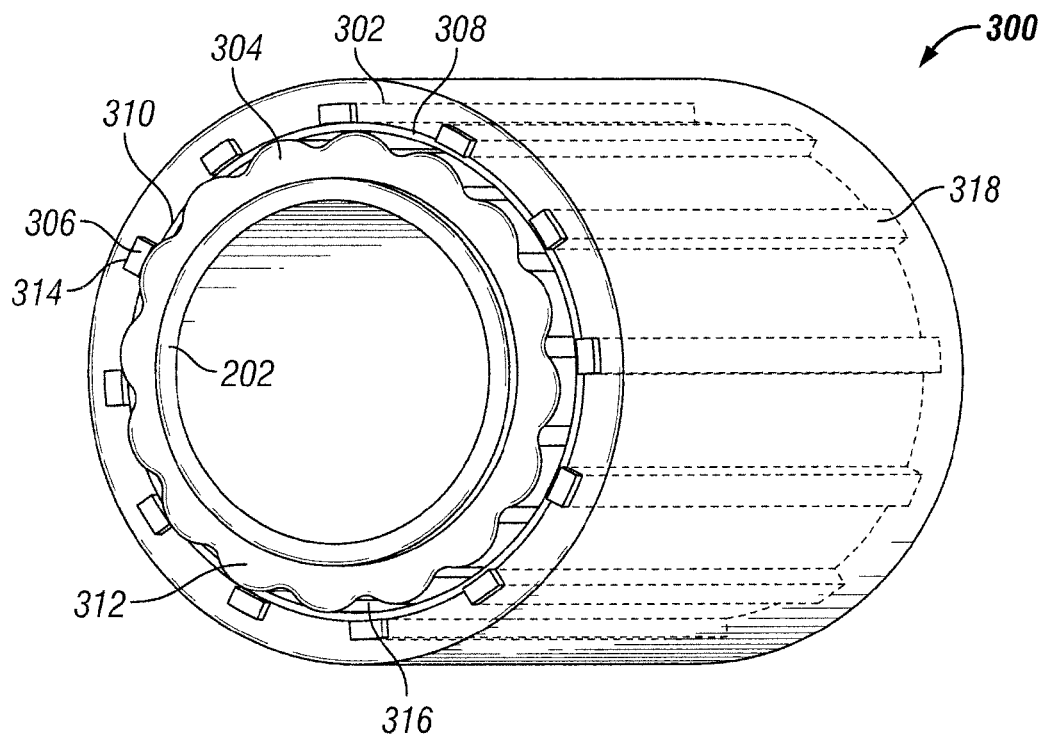
FIG. 3a illustrates a perspective view of a power generation unit with stacked piezoelectric elements, in accordance with example embodiments of the present disclosure.
Figure 3B:
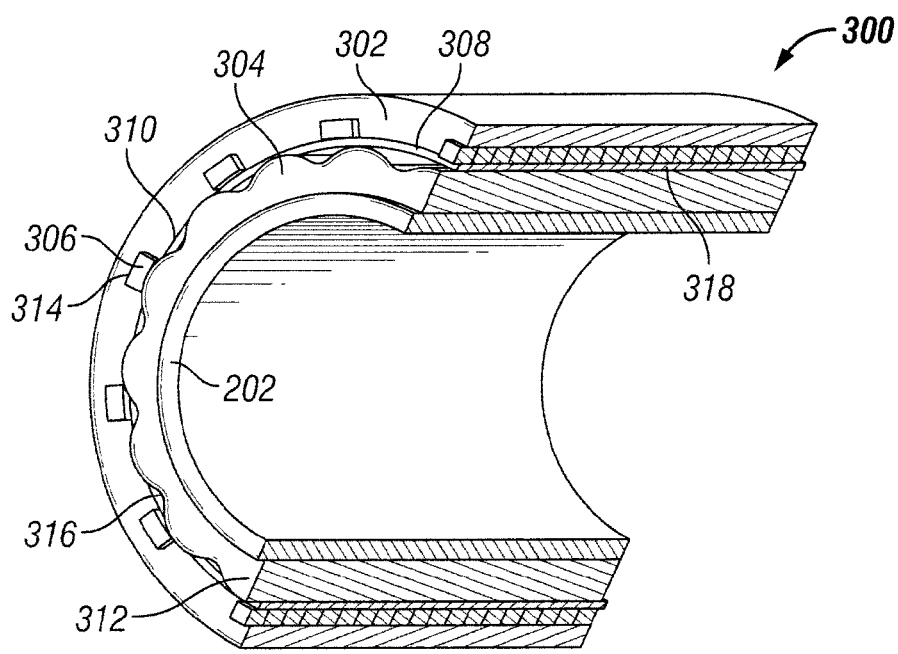
FIG. 3b illustrates a cross-sectional view of the power generation unit of FIG. 3a, in accordance with example embodiments of the present disclosure.

In certain example embodiments, the power generation unit 210 includes piezoelectric elements, which when actuated through vibrational motion, generate energy. FIGS. 3-8 illustrate various example embodiments of the power generation unit 210. FIG. 3*a* illustrates a perspective view of a power generation unit 300 with stacked piezoelectric elements 306, and FIG. 3*b* illustrates a cross-sectional view of the power generation unit 300 of FIG. 3*a*, in accordance with example embodiments of the present disclosure. Referring to FIGS. 3*a* and 3*b*, the power generation unit 300 includes a stator 302 and a rotor 304. In certain example embodiments, the stator 302 is cylindrical shaped with an inside surface 310 defining an internal orifice. The stator 302 includes one or more stacked piezoelectric elements 306 disposed along the inside surface 310. In certain example embodiments, the stacked piezoelectric elements 306 are made up of a plurality of piezoelectric sheets stacked together. In certain example embodiments, the stacked piezoelectric elements 306 are disposed in one or more rows 318. In certain example embodiments, the stacked piezoelectric elements 306 are disposed in respective recesses 314 formed along the inside surface 310. Generally, the shape of the recesses 314 are configured to receive the at least a portion of the stacked piezoelectric elements 306. In certain example embodiments, at least one side of the stacked piezoelectric elements 306 is exposed to the internal orifice and/or is raised above the profile of the inside surface 310.

Figure 9:
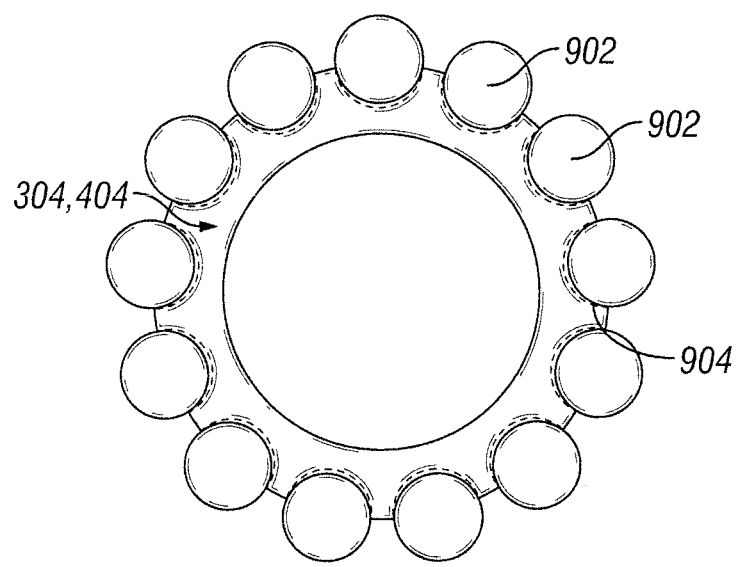
FIG. 9 illustrates a cross-sectional view of a rotor with outward rollers, in accordance with example embodiments of the present disclosure.

In certain example embodiments, the rotor 304 is at least partially disposed within the internal orifice of the stator 302. In certain example embodiments, the rotor 304 is substantially cylindrical shaped with one or more lobes 312 formed on an outside surface 316. In certain example embodiments, the lobes 312 have a curved or rounded shape as shown in the drawings. In certain other example embodiments, the lobes 312 have triangular or gear-teeth shapes, among other shapes. In certain example embodiments, as the rotor 304 rotates, the motion of the lobes 312 applies a force to the one or more stacked piezoelectric elements 306 and the force includes a normal component that pushes against the piezoelectric elements 306 in an outward direction toward the stator 302. The stacked piezoelectric elements 306 generate energy when impacted by the normal force. In example embodiments, the lobes 510 are formed integrally with the rotor 502. In certain other embodiments, and as illustrated in FIG. 9, the lobes 312 include rollers 902 disposed in correspondingly shaped roller holders 904 formed on the rotor 304. The roller holders 904 retain the rollers 902 while allowing the rollers 902 to spin. In such example embodiments, the rollers 902 are roll across the one or more stacked piezoelectric elements 306 rather than sliding across the one or more stacked piezoelectric elements 306. This reduces the amount of friction and abrasive wear on the equipment. In certain example embodiments, the rotor 304 is coupled to an impeller 204 (FIG. 2) and thus rotates when the impeller 204 rotates in response to the flow of fluid. When the rotor 304 rotates, the one or more lobes 312 continuously impact the one or more stacked piezoelectric elements 306, and the power generation unit 300 converts electric pulses from stacked piezoelectric elements to electric power.

In certain example embodiments, the rotor 304 is disposed around the pipe 202 and rotates around the pipe 202. In certain example embodiments, the power generation unit 300 further includes a protective layer 308 disposed between the stator 302 and the rotor 304. The protective layer 308 is thus also disposed between the stacked piezoelectric elements 306 and the lobes 312. The protective layer 308 decreases the amount of frictional force between the stacked piezoelectric elements 306 and the lobes 312, which decreases wear on the stacked piezoelectric elements 306. The protective layer can be fabricated from any material which translates the normal force of the lobes 312 to the stacked piezoelectric elements 306. In certain example embodiments, the protective layer may be metallic or polymeric materials.

Figure 4A:
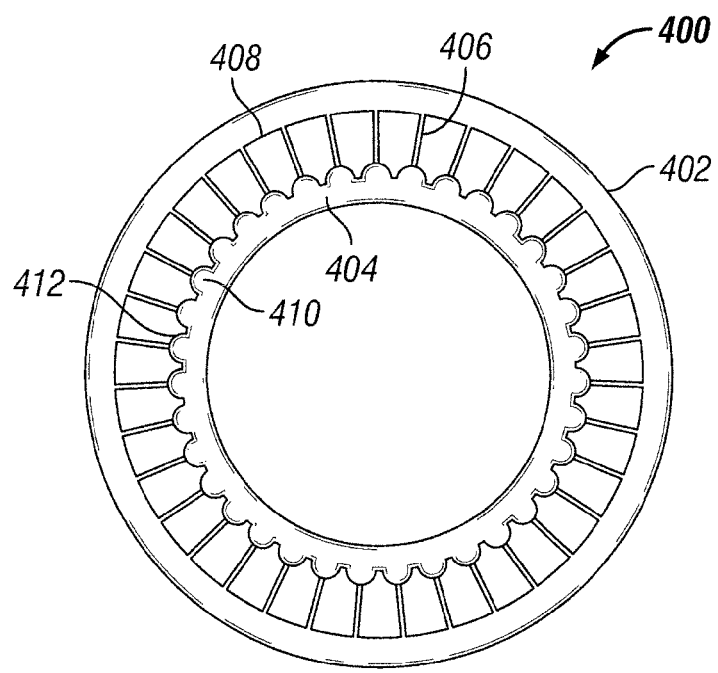
FIG. 4a illustrates a cross-sectional view of a power generation unit having flexible piezoelectric elements, in accordance with example embodiments of the present disclosure.
Figure 4B:
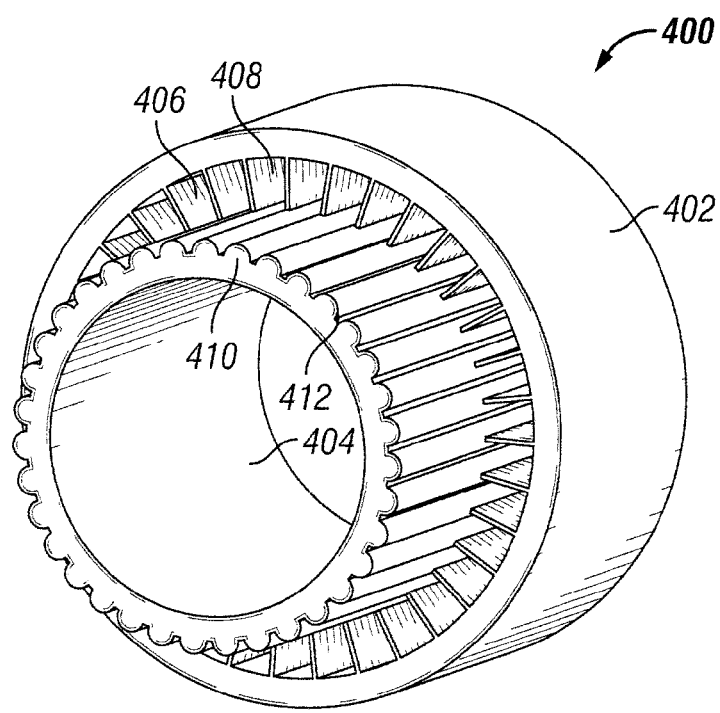
FIG. 4b illustrates a perspective view of the power generation unit of FIG. 4a, in accordance with example embodiments of the present disclosure.

FIG. 4*a* illustrates a cross-sectional view of a power generation unit 400 having flexible piezoelectric elements 406, and FIG. 4*b* illustrates a perspective view of the power generation unit 400 of FIG. 4*a*, in accordance with example embodiments of the present disclosure. Referring to FIGS. 4*a* and 4*b*, the power generation unit 400 includes a stator 402 and a rotor 404. In certain example embodiments, the stator 402 is cylindrical shaped with an inside surface 408 defining an internal orifice. The stator 402 includes one or more flexible piezoelectric sheets 406 extending inwardly from the inside surface 310. In certain example embodiments, the flexible piezoelectric sheets 406 are disposed in one or more rows along a length of the stator 402.

In certain example embodiments, the rotor 404 is at least partially disposed within the internal orifice of the stator 402. In certain example embodiments, the rotor 404 is substantially cylindrical shaped with one or more lobes 410 formed on an outside surface 412 of the rotor 404. In certain example embodiments, the flexible piezoelectric sheets 406 extend from the stator 402 towards the rotor 404. In certain example embodiments, the flexible piezoelectric sheets 406 extend a distance beyond the lobes 410 such that when a lobe 410 passes a flexible piezoelectric sheet 406, the sheet 406 bends to allow the lobe 410 to pass. The bending causes the flexible piezoelectric sheets 406 to vibrate and generate energy. Thus, when the rotor 404 rotates, the one or more lobes 410 continuously cause the one or more flexible piezoelectric sheets 406 to bend, and the power generation unit 400 generates power. In certain example embodiments, the free end tips of flexible piezoelectric sheets 406, where piezoelectric elements contact with lobes 410, are made of wear-resistant material to reduce the material loss by abrasive wear. In certain other embodiments, and as illustrated in FIG. 9, the lobes 410 are rollers 902 disposed in the roller holders 904. In certain example embodiments, the rotor 404 is coupled to an impeller 204 (FIG. 2) and thus rotates when the impeller 204 rotates in response to the flow of fluid. In certain example embodiments, the rotor 404 is disposed around the pipe 202 (FIG. 2) and rotates around the pipe 202.

Figure 5:
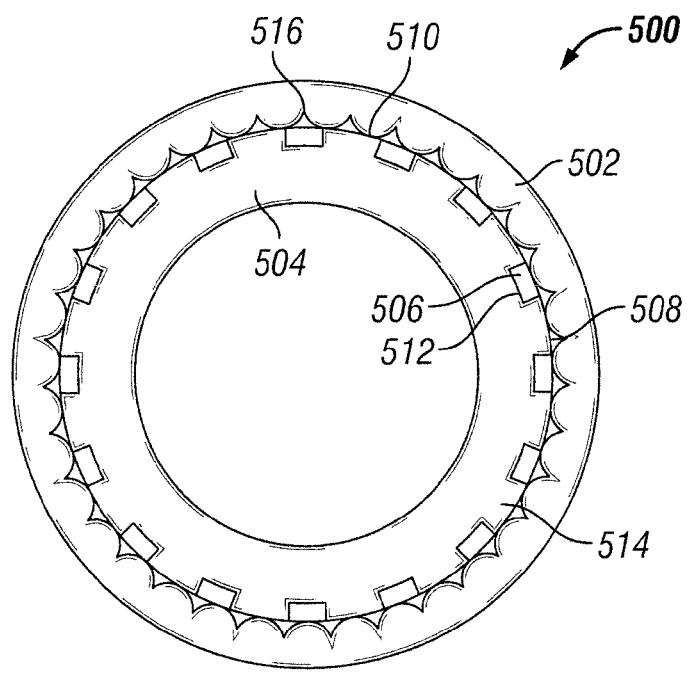
FIG. 5 illustrates a cross-sectional view of a power generation unit having stacked piezoelectric elements, in accordance with example embodiments of the present disclosure.

FIG. 5 illustrates a cross-sectional view of a power generation unit 500 having stacked piezoelectric elements 506, in accordance with example embodiments of the present disclosure. With reference to FIG. 5, the power generation unit 500 includes a rotor 502 and a stator 504. In certain example embodiments, the rotor 502 is cylindrical shaped and rotates around the stator 504. The stator 504 is also cylindrically shaped and includes one or more stacked piezoelectric elements 506 disposed along an outer surface 514 of the stator 504. In certain example embodiments, the stacked piezoelectric elements 506 are disposed in one or more rows. In certain example embodiments, the stacked piezoelectric elements 506 are disposed in respective recesses 512 formed along the outside surface 514. In certain example embodiments, at least one side of the stacked piezoelectric elements 506 is exposed and/or raised above the profile of the outside surface 514.

Figure 10:
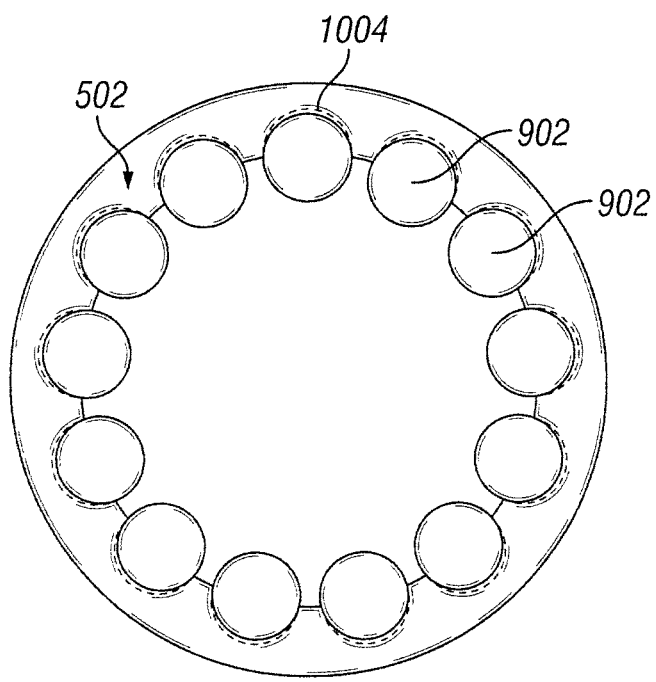
FIG. 10 illustrates a cross-sectional view of a rotor with inward rollers, in accordance with example embodiments of the present disclosure.

In certain example embodiments, the rotor 502 includes one or more lobes 510 formed on an inside surface 516. In certain example embodiments, the lobes 510 apply a normal force onto the one or more stacked piezoelectric elements 506 when the lobes 510 come into contact with the stacked piezoelectric elements 506. The stacked piezoelectric elements 506 generate energy when impacted by the normal force. In example embodiments, the lobes 510 are formed integrally with the rotor 502. In certain other embodiments, and as illustrated in FIG. 10, the lobes 510 include rollers 902 disposed in correspondingly shaped roller holders 1004 formed on the rotor 502. In certain example embodiments, the rotor 502 is coupled to an impeller 204 (FIG. 2) and thus rotates when the impeller 204 rotates in response to the flow of fluid. When the rotor 502 rotates, the one or more lobes 510 continuously impact the one or more stacked piezoelectric elements 506, and the power generation unit 500 converts electric pulses from stacked piezoelectric elements to electric power. In certain example embodiments, the stator 504 is disposed around the pipe 202 (FIG. 2). In certain example embodiments, the power generation unit 500 further includes a protective layer 508 disposed between the stator 504 and the rotor 502. The protective layer 508 is thus also disposed between the stacked piezoelectric elements 506 and the lobes 510. The protective layer 508 decreases the amount of frictional force between the stacked piezoelectric elements 506 and the lobes 510, which decreases wear on the stacked piezoelectric elements 506. The protective layer 508 can be fabricated from any material which translates the normal force of the lobes 510 to the stacked piezoelectric elements 506. In certain example embodiments, the protective layer 508 may be metallic or polymeric materials.

Figure 6:
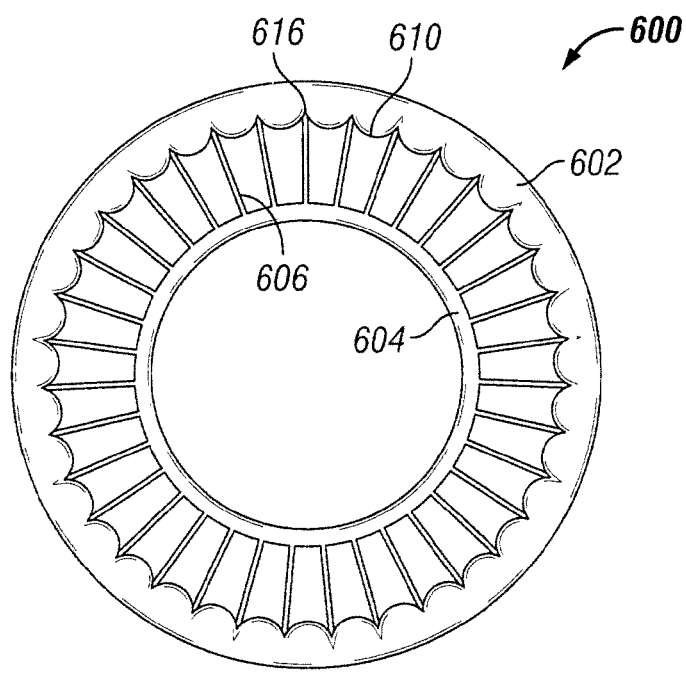
FIG. 6 illustrates a cross-sectional view of a power generation unit having flexible piezoelectric elements, in accordance with example embodiments of the present disclosure.

FIG. 6 illustrates a cross-sectional view of a power generation unit 600 having flexible piezoelectric elements 606, in accordance with example embodiments of the present disclosure. Referring to FIG. 6, the power generation unit 600 includes a rotor 602 and a stator 604. In certain example embodiments, the stator 604 is disposed with the rotor 602. The rotor 602 is cylindrically shaped and rotates around the stator 604. The stator 604 includes one or more flexible piezoelectric sheets 606 extending outwardly from the stator 604, which is also cylindrically shaped. In certain example embodiments, the flexible piezoelectric sheets 606 are disposed in one or more rows along a length of the stator 604 and around the stator 604.

In certain example embodiments, the rotor 602 includes one or more lobes 610 formed on an inside surface 616 of the rotor 602. In certain example embodiments, the flexible piezoelectric sheets 606 extend from the stator 604 towards the rotor 602. In certain example embodiments, the flexible piezoelectric sheets 606 extend a distance beyond the lobes 610 such that when a lobe 610 passes a flexible piezoelectric sheet 606, the sheet 606 bends to allow the lobe 610 to pass. The bending causes the flexible piezoelectric sheets 606 to vibrate and generate energy. Thus, when the rotor 602 rotates, the one or more lobes 610 continuously cause the one or more flexible piezoelectric sheets 606 to bend, and the power generation unit 600 generates power. In certain other embodiments, and as illustrated in FIG. 10, the lobes 510 are rollers 902 disposed in the roller holders 1004. In certain example embodiments, the rotor 602 is coupled to an impeller 204 (FIG. 2) and thus rotates when the impeller 204 rotates in response to the flow of fluid. In certain example embodiments, the rotor 602 is disposed around the pipe 202 (FIG. 2) and rotates around the pipe 202.

Figure 7:
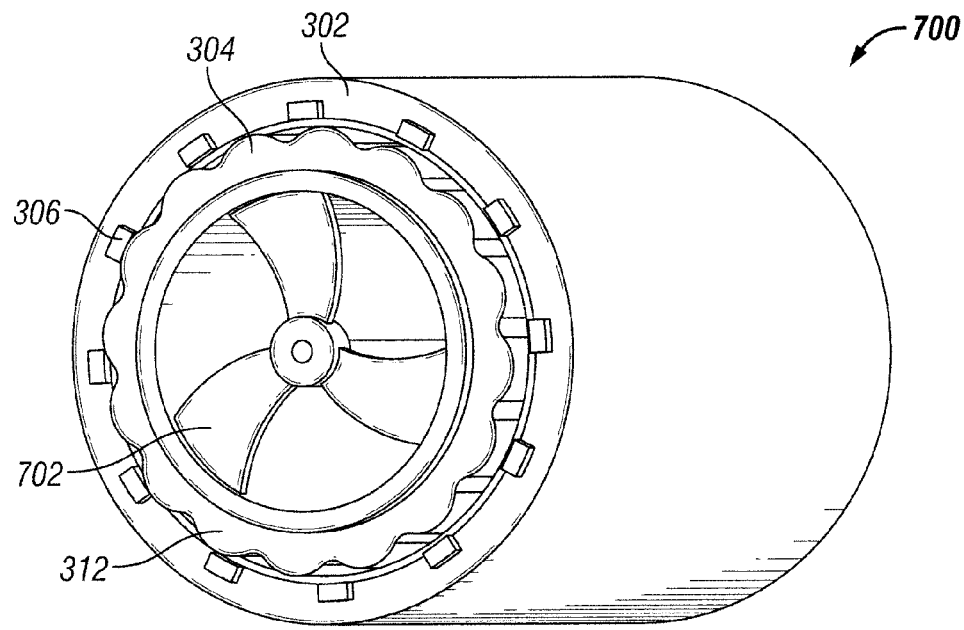
FIG. 7 illustrates a power generation unit with an integrated impeller, in accordance with example embodiments of the present disclosure.

FIG. 7 illustrates a power generation unit 700 with an integrated impeller, in accordance with example embodiments of the present disclosure. The power generation unit 700 of FIG. 7 is similar to the power generation unit 300 of FIGS. 3a and 3b, with the exception that the power generation unit 700 further includes an impeller 702 disposed within and coupled to the rotor 304, rather than a pipe 202 as illustrated in FIG. 3a. In such example embodiments, an orifice formed in the rotor 304 is configured to allow fluid to flow therethrough, actuating the impeller 702 and causing the impeller 702 to rotate, thus causing the rotor 304 to rotate as well. When the rotor 304 rotates, the lobes 312 apply a normal force onto the stacked piezoelectric elements 306 and energy is generated. In certain example embodiments, the power generation unit 400 of FIGS. 4a and 4b can also include an impeller 702 coupled to and disposed within the rotor 404. Such embodiments can be used for any power generation application in which fluid is to traverse the rotor 304, 404, such as underwater power generation, wind power generation, and the like.

Figure 8:
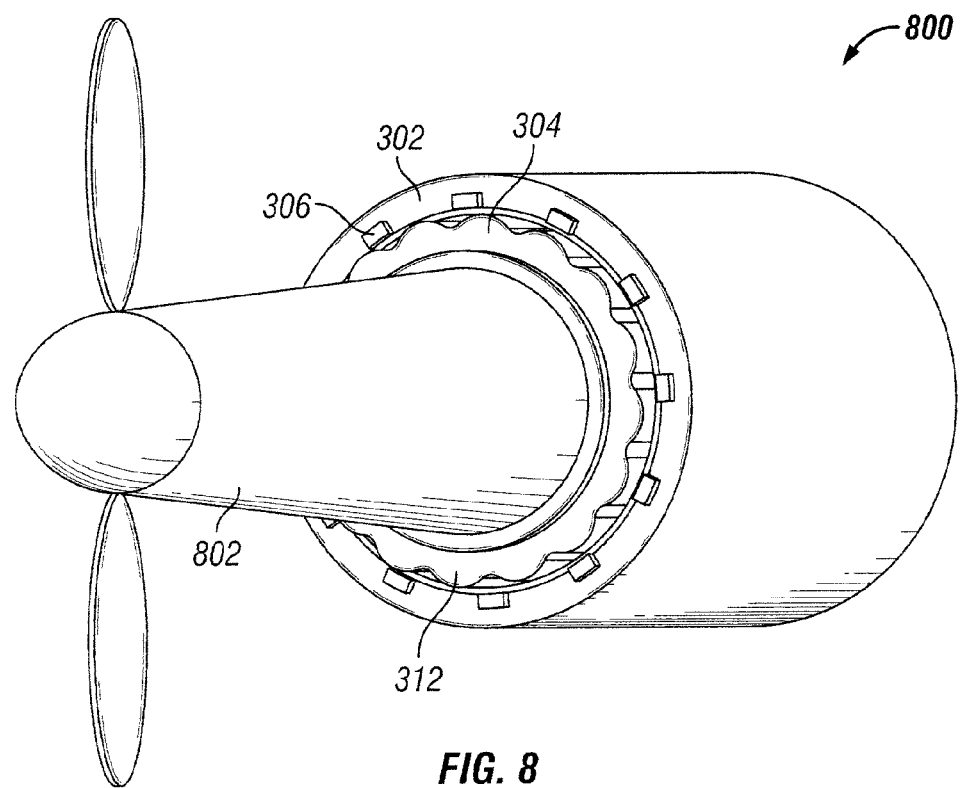
FIG. 8 illustrates a power generation unit within an integrated propeller, in accordance with example embodiments of the present disclosure.

FIG. 8 illustrates a power generation unit 800 with an integrated propeller, in accordance with example embodiments of the present disclosure. The power generation unit 800 of FIG. 8 is similar to the power generation unit 300 of FIGS. 3a and 3b, with the exception that the power generation unit 800 further includes a propeller 802 coupled to the rotor 304. In certain example embodiments, the propeller 802 extends from the rotor 304. In such example embodiments, when fluid flows towards the power generation unit 800, the propeller 802 spins and causes the rotor 304 to rotate as well. When the rotor 304 rotates, the lobes 312 apply a normal force onto the stacked piezoelectric elements 306 and energy is generated. In certain example embodiments, the power generation unit 400 of FIGS. 4a and 4b can also include a propeller 802 coupled to the rotor 404. Such embodiments can be used for any power generation application in which fluid flows towards the power generation device 800 such as in underwater power generation, wind power generation, and the like. In certain example embodiments, the propeller 802 of FIG. 8 and the impeller 702 of FIG. 7 can also be configured in other arrangements so that they can be coupled to drive the rotors 502, 602 when they are positioned on the outer portion of the units as shown in FIGS. 5 and 6.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A piezoelectric power generation system, comprising:
a power generation device comprising:
   a stator comprising an internal surface, the internal surface defining an internal orifice;
   one or more piezoelectric power generation elements disposed on the internal surface of the stator;
   a rotor disposed within the internal orifice comprising one or more lobes formed on an outside surface of the rotor, wherein the rotor comprises a central opening configured to receive a pipe or a flow of fluid therethrough,
   wherein the rotor is configured to rotate with respect to the stator and the one or more piezoelectric power generation elements, wherein the one or more lobes contact the one or more piezoelectric power generation elements as the one or more lobes rotate past the one or more piezoelectric power generation elements, and wherein the one or more piezoelectric power generation elements generate energy when contacted by the one or more lobes;
   an impeller coupled to the rotor and configured to rotate the rotor when the impeller is actuated by a flow of fluid; and
a power storage device configured to store energy generated by the one or more piezoelectric power generation elements.

2. The piezoelectric power generation system of claim 1, wherein the one or more piezoelectric power generation elements comprise one or more stacked piezoelectric elements, wherein the one or more lobes impart a normal force onto the one or more stacked piezoelectric elements when the one or more lobes rotate past the one or more stacked piezoelectric elements.

3. The piezoelectric power generation system of claim 1, wherein the one or more piezoelectric power generation elements comprise one or more flexible piezoelectric sheets which extend from the stator towards the rotor, and wherein the one or more lobes cause the one or more flexible piezoelectric sheets to bend when the one or more lobes rotate past the one or more flexible piezoelectric sheets.

4. The piezoelectric power generation system of claim 3, wherein the one or more flexible piezoelectric sheets each comprise an outer tip having a wear-resistance material.

5. The piezoelectric power generation system of claim 1, wherein the one or more lobes have at least one of a rounded shape, a triangular shape, or a gear-tooth shape.

6. The piezoelectric power generation system of claim 1, further comprising a housing in which the power generation device is disposed, wherein the housing isolates the power generation device from the flow of fluid.

7. The piezoelectric power generation system of claim 1, wherein the one or more lobes are formed integrally with the rotor.

8. The piezoelectric power generation system of claim 1, wherein the one or more lobes include one or more rollers disposed in one or more respective roller holders formed in the rotor, and wherein the one or more rollers spin freely within the roller holders.

9. A piezoelectric power generation device, comprising:
   a stator comprising an internal surface, the internal surface defining an internal orifice;
   one or more piezoelectric power generation elements disposed on the internal surface of the stator;
   a rotor disposed within the internal orifice comprising one or more lobes formed on an outside surface of the rotor; and
   an impeller coupled and disposed within the rotor, wherein actuation of the impeller rotates the rotor,
   wherein the rotor is configured to rotate with respect to the stator and the one or more piezoelectric power generation elements, wherein the one or more lobes contact the one or more piezoelectric power generation elements as the one or more lobes rotate past the one or more piezoelectric power generation elements, and wherein the one or more piezoelectric power generation elements generate energy when contacted by the one or more lobes.

10. The piezoelectric power generation device of claim 9, wherein the one or more piezoelectric power generation elements comprise one or more stacked piezoelectric elements, and wherein the one or more lobes impart a normal force onto the one or more stacked piezoelectric elements when the one or more lobes rotate past the one or more stacked piezoelectric elements.

11. The piezoelectric power generation device of claim 9, wherein the one or more piezoelectric power generation elements comprise one or more flexible piezoelectric sheets which extend from the stator towards the rotor, and wherein the one or more lobes cause the one or more flexible piezoelectric sheets to bend when the one or more lobes rotate past the one or more flexible piezoelectric sheets.

12. The piezoelectric power generation device of claim 9, further comprising a propeller coupled to the rotor, wherein actuation of the propeller rotates the rotor.

13. The piezoelectric power generation device of claim 10, further comprising a protective layer disposed between the one or more stacked piezoelectric elements and the one or more lobes, wherein the protective layer transfers the normal force applied by the one or more lobes to the one or more stacked piezoelectric elements.

14. The piezoelectric power generation device of claim 9, wherein the stator and the rotor are both cylindrically shaped.

15. A piezoelectric power generation device, comprising:
   a rotor comprising an internal surface, the internal surface defining an internal orifice, wherein one or more lobes are disposed on the internal surface;
   a stator disposed within the internal orifice, the stator comprising an outer surface; and
   one or more piezoelectric power generation elements disposed on the outer surface of the stator towards the internal surface of the rotor,
   wherein the rotor is configured to rotate around the stator and the one or more piezoelectric power generation elements, wherein the one or more lobes contact the one or more piezoelectric power generation elements as the one or more lobes rotate past the one or more piezoelectric power generation elements, and wherein the one or more piezoelectric power generation elements generate energy when contacted by the one or more lobes.

16. The piezoelectric power generation device of claim 15, wherein the one or more piezoelectric power generation elements comprise one or more stacked piezoelectric elements, and wherein the one or more lobes impart a normal force onto the one or more stacked piezoelectric elements when the one or more lobes rotate past the one or more stacked piezoelectric elements.

17. The piezoelectric power generation device of claim 15, wherein the one or more piezoelectric power generation elements comprise one or more flexible piezoelectric sheets which extend from the stator towards the rotor, and wherein the one or more lobes cause the one or more flexible piezoelectric sheets to bend when the one or more lobes rotate past the one or more flexible piezoelectric sheets.

18. The piezoelectric power generation device of claim 16, further comprising a protective layer disposed between the one or more stacked piezoelectric elements and the one or more lobes, wherein the protective layer transfers the normal force applied by the one or more lobes to the one or more stacked piezoelectric elements.

19. The piezoelectric power generation device of claim 15, further comprising an impeller coupled to the rotor and configured to rotate the rotor.

20. The piezoelectric power generation device of claim 15, wherein the stator comprises a central opening configured to receive a pipe or a flow of fluid therethrough.

21. The piezoelectric power generation device of claim 15, wherein the one or more lobes are formed integrally with the rotor.

22. The piezoelectric power generation device of claim 15, wherein the one or more lobes include one or more rollers disposed in one or more respective roller holders formed in the rotor, and wherein the one or more rollers spin freely within the roller holders.

23. The piezoelectric power generation system of claim 17, wherein the one or more flexible piezoelectric sheets each comprise an outer tip having a wear-resistance material.

* * * * *